Jan. 10, 1950 S. NOWKA 2,493,995
WORK DRIVER UNIT
Filed June 19, 1945 3 Sheets-Sheet 1
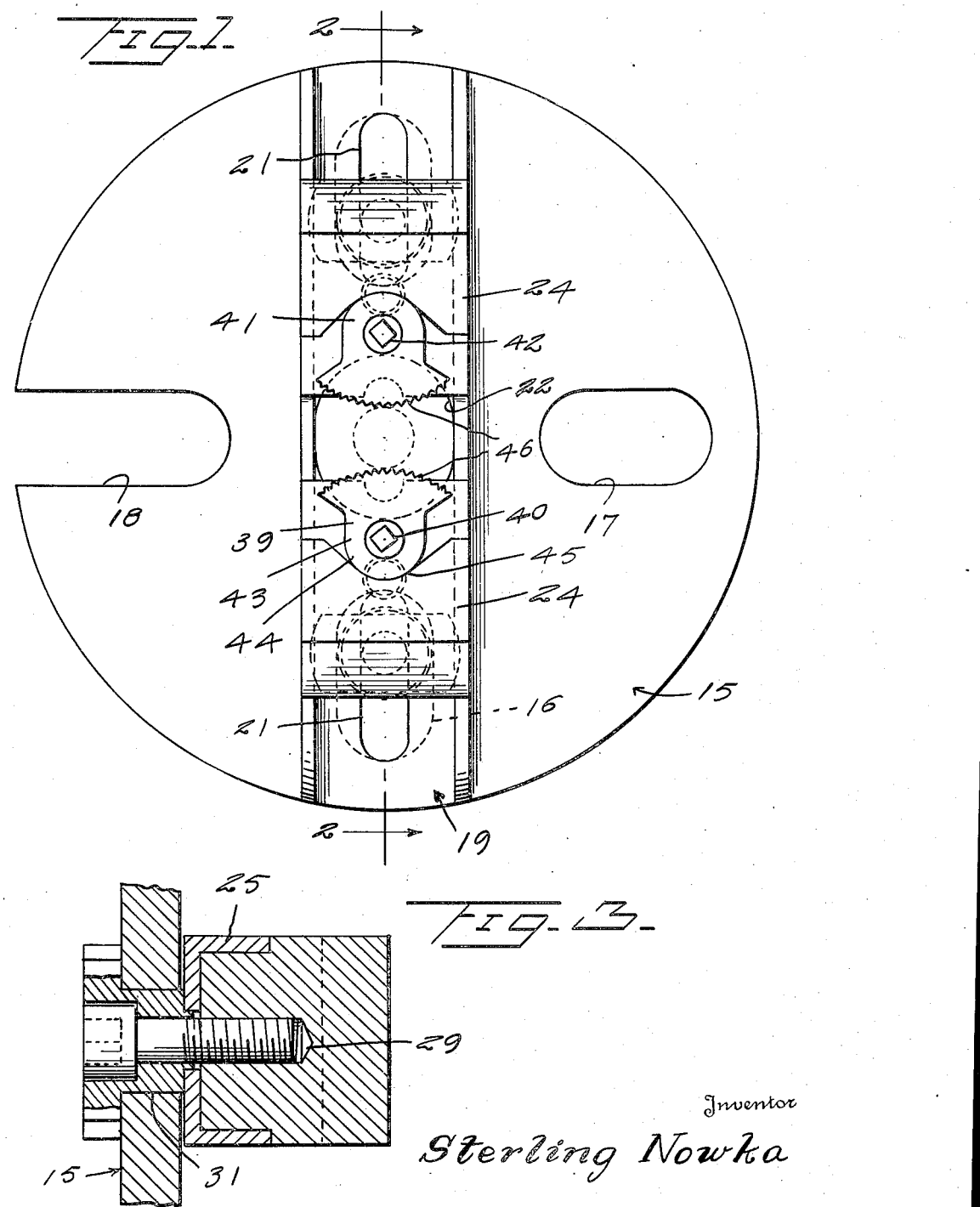

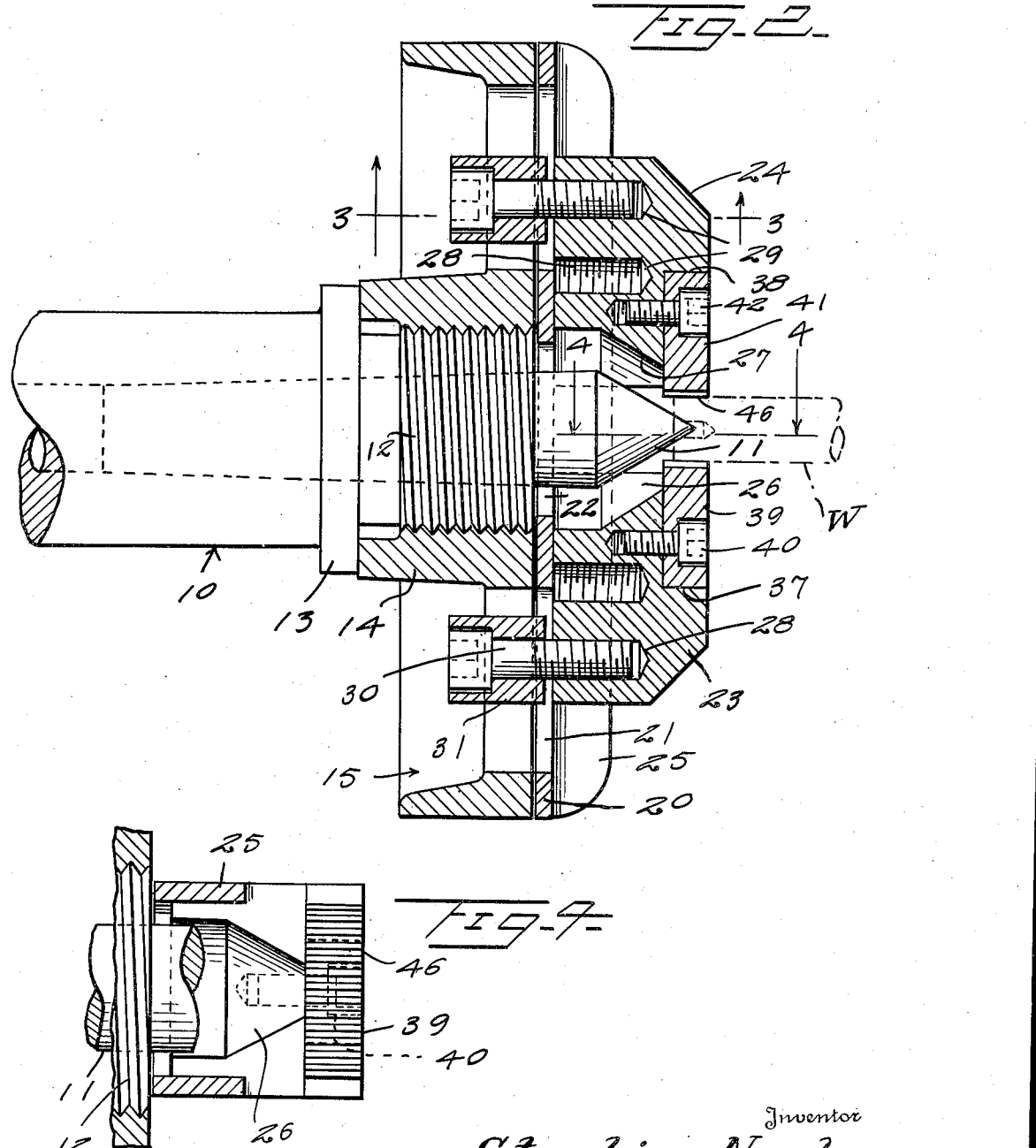

Jan. 10, 1950
S. NOWKA
2,493,995
WORK DRIVER UNIT
Filed June 19, 1945
3 Sheets—Sheet 3
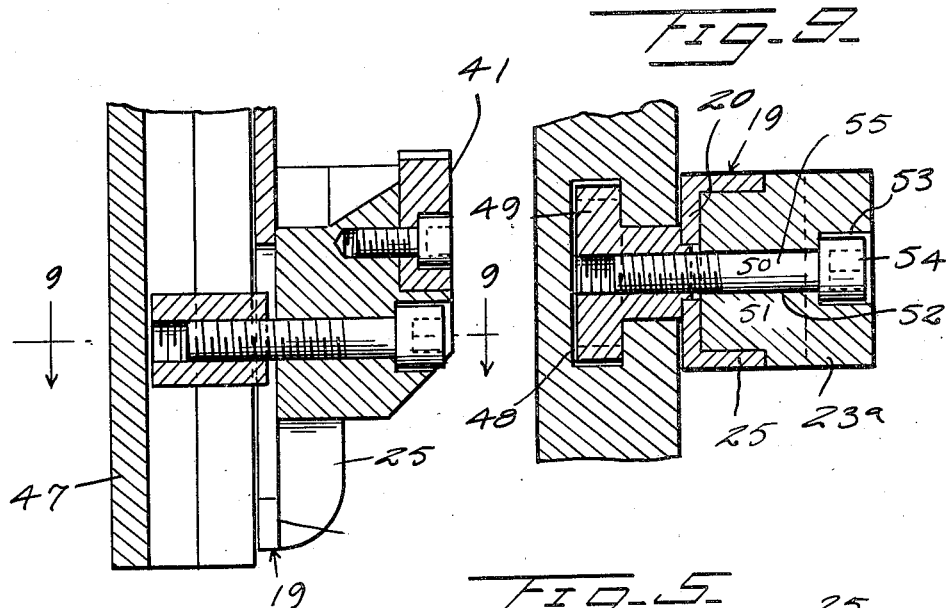
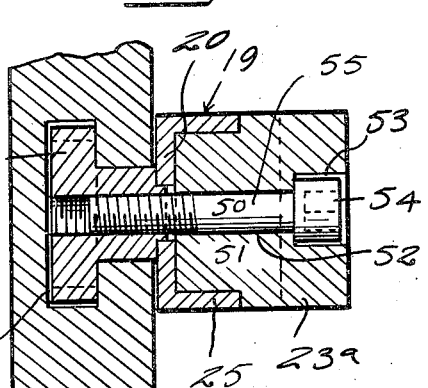
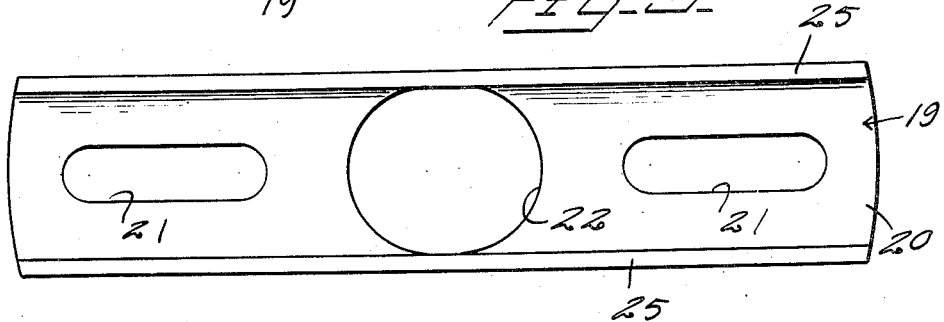
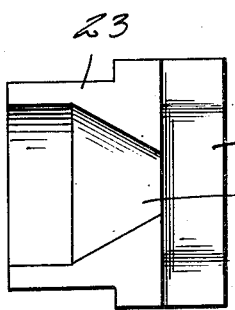
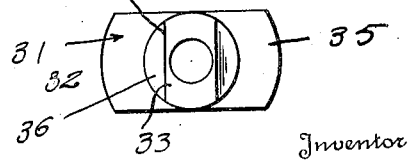

Patented Jan. 10, 1950

2,493,995

UNITED STATES PATENT OFFICE 2,493,995

WORK DRIVER UNIT

Sterling Nowka, North Tonawanda, N. Y.

Application June 19, 1945, Serial No. 600,389

3 Claims. (Cl. 82—42)

This invention relates to an improved work driver or gripper.

An object of the invention is to provide a work driver or gripper which will automatically grip or clamp a workpiece disposed between a pair of centers, the work driver being secured to a face plate or the like which is carried by the rotatable spindle so as to rotate the workpiece.

Another object of this invention is to provide a device of this kind which is automatic in its operation and will grip the workpiece tightly in either direction of rotation of the prime mover.

A further object of this invention is to provide a device of this kind which may constitute an attachment for a face plate or similar part of a lathe, or other machine, wherein the workpiece is rotatable between a pair of centers.

A further object of this invention is to provide a device of this kind which in either direction of rotation of the prime mover will tightly grip the workpiece and the gripping force will increase proportionately to the torque on the workpiece.

A further object of this invention is to provide a device of this kind which is constructed as an attachment for a machine tool and can be mounted on the present parts of the machine tool without alteration.

A further object of this invention is to provide a device of this kind which is self-centering and will effectively grip the workpiece irrespective of the position of the center point recess in the workpiece. In other words, the gripping jaws will work effectively whether the workpiece is centered accurately or inaccurately.

To the foregoing objects, and others which may hereinafter more fully appear, the invention consists of the novel construction, combination and arrangement of parts, as will be more specifically referred to, and illustrated in the accompanying drawings, but it is to be understood that changes, variations and modifications may be resorted to which fall within the scope of the invention as claimed.

In the drawings:

Figure 1 is a detail front elevation of a device constructed according to an embodiment of this invention mounted on a face plate forming part of a machine tool.

Figure 2 is a sectional view taken on the line 2—2 of Figure 1.

Figure 3 is a fragmentary sectional view taken on the line 3—3 of Figure 2.

Figure 4 is a fragmentary sectional view taken on the line 4—4 of Figure 2.

Figure 5 is a detail front elevation of the channeled base member.

Figure 6 is a detail inner end elevation of one of the jaw supporting blocks.

Figure 7 is an inner end elevation of one of the mounting or adapter members for mounting the device on the machine tool.

Figure 8 is a fragmentary sectional view of the device showing a modified form of mounting for mounting the device on the machine tool.

Figure 9 is a sectional view taken on the line 9—9 of Figure 8.

Referring to the drawings, and first to Figures 1 to 7, the numeral 10 designates generally a spindle which has mounted therein a center point 11. The spindle 10 is formed with an annular flange 13 inwardly from the outer end thereof, and is also formed with a threaded end portion 12 upon which the hub 14 of a face plate 15 is adapted to be threaded. The face plate 15 is of conventional construction, as shown in Figure 1, and is formed with a pair of diametrically opposed elongated slots 16 and a second pair of elongated slots 17 and 18 with the latter opening through the periphery of the face plate.

The face plate 15 is formed with a rearwardly extending annular flange, forming a reinforcing means for the plate, and the right angularly related pairs of slots provide a means whereby workpieces may be bolted or clamped to the face plate and in the present instance the open slot 18 is initially used for the rearwardly projecting lug of the work holding dog.

In order to provide a means whereby the workpiece may be tightly gripped or clamped with respect to the center point 11, I have provided a U-shaped or channeled base member 19 which is adapted to engage the forward face of the plate 15. The bight 20 of the base member 19 is formed with a pair of elongated slots 21 and also with a central opening 22 through which the center point 11 is adapted to loosely extend. A pair of jaw holding or supporting blocks 23 and 24 are seated between the opposite sides 25 of the base member 19, and are formed at their inner ends with cutouts 26 and 27 respectively through which the center point 11 is adapted to loosely engage.

The blocks 23 and 24 are each formed with pairs of threaded sockets 28 and 29 respectively opening through their rear side and within selected ones of which a headed bolt 30 is adapted to engage. There are two of these bolts 30, one for each block, and the bolts 30 extend through an adapter 31. The adapter 31, shown more clearly in Figure 7, includes a rounded shank 32 which has a reduced thickness forward portion 33, formed of parallel sides 34 which are adapted to engage in the slots 21 so that the shank 32 will be held against rotation with respect to the base member 19.

The adapter 31 also includes a head 35 extending at right angles to the flat sides 34 so that the head 35 will extend at right angles to the slots 16, in the face plate 15. The shank 32 is adapted to have relative movement within a slot 16 of the face plate whereas the shoulder, formed by the reduced forward end portion 32 of the shank, and designated by the numeral 36, is adapted to tightly engage against the rear side of the bight 20. In this manner the adapter 31 will be tightly secured with respect to the channeled base member 19, but the adapters will have relative radial movement in the slots 16 of the face plate 15. The base member 19 may thereby be self-centering with respect to the workpiece W irrespective of the accurate positioning of the center hole in the workpiece.

The block 23 is formed in its forward side with a jaw socket 37 and the block 24 is formed with a jaw socket 38 in its forward side. A jaw 39 is rockably mounted in socket 37 being pivotally secured in the socket by means of the pivot bolt 40. A cam-shaped jaw 41 is rockably mounted in socket 38 being pivotally held in the socket by a pivot bolt 42. The two jaws 39 and 41 are of like construction and each includes a shank 43 having a rounded outer end 44 adapted to rotatably engage or contact with the adjacent rounded socket portion 45. This socket portion 45 provides a cam edge which is the means of working the jaws. In this manner the pressure applied to the jaw will be communicated to the block 23 or to the block 24 rather than to the pivot bolt for the jaw. Jaw 39 is formed with an arcuate serrated gripping face or sector-gear-faced working edge 46, which has a radius greater than the distance from the center of the pivot bolt 40 to the gripping surface 46 so that the two jaws 39 and 41 will tightly wedge a workpiece there-between as torque is applied to the workpiece. It will be seen that the jaws have inner rounded edges adapted to be engaged by the cam edges 45 of the jaw supporting members.

In Figure 1 the two jaws 39 and 41 are shown in their neutral or released position whereas when torque is applied to the workpiece these jaws will rock in opposite directions, and will tightly grip the workpiece there-between.

Referring now to Figures 8 and 9 there is disclosed a modified mounting for the work driver. In this form there is disclosed a face plate 47 which is formed with a plurality of radially arranged T-shaped slots 48 in the forward face thereof. In this instance the base member 19 is secured to the outer or forward side of the face plate 47 by means of T-shaped nuts 49 which slidably engage in the slots 48. The nuts 49 have reduced forward end portions 50 engaging in the slots 51 of the base member 19. The block 23a, in this instance, has a hole 52 extending therethrough with a counter bore 53 within which the head 54 of a bolt 55 is adapted to be countersunk. The bolt 55 is threaded into the nut 49 and tightly holds this nut against the bight 20 of the base member 19. In other respects the construction shown in Figures 8 and 9 is similar in every detail to the construction shown in Figures 1 to 7.

In the use and operation of this device the base member 19 is loosely and slidably secured to the face plate 15 by the adapter members 31. The jaw supporting blocks 23 and 24 are roughly adjusted on opposite sides of the center point 11 by engagement of the bolts 30 in selected openings 28 and 29 of these blocks. The jaws 39 and 41 are initially adjusted to substantially the positions shown in Figure 1, whereupon the workpiece is inserted between the jaws and engaged with the center point 11. The workpiece may then be initially rotated to swing the jaws 39 and 40 to their gripping position. As the face plate rotates along with the base member the cam edge 45 of the jaw supporting blocks will exert a rocking action upon the pivoted jaws. The rounded edges of these rockable jaws will be engaged for this purpose, by the cam edges 45 of the blocks. Inasmuch as the sector-gear-faced working edges of the rocking jaws will be crowded against the work, relative movement of the blocks on the base member with respect to these jaws is permitted to a limited extent. Thereafter, the workpiece may be engaged by the cutter which will effect additional gripping by the jaws 39 and 41 on the workpiece, the degree of gripping being dependent on the torque applied to the workpiece.

This device may be made as an attachment for a face plate or other support carried by a machine tool, such as a lathe, grinder or other machine tool where the workpiece is supported between a pair of centers. The workpiece is automatically clamped by the cam-shaped jaws and the workpiece can readily be released by rotating the workpiece in a reverse direction. The jaws 39 and 41 are so constructed as to grip the workpiece in either direction of rotation of the face plate, and when the device has once been set for a particular size of workpiece no tool is required to insert or release the workpiece from the device.

I claim:

1. A workpiece gripping device for a machine tool comprising a driving shaft, a face plate thereon, a channelled base member formed with a pair of elongated slots in the bight thereof, a pair of blocks engaging in the channel of said member, means engaging through said slots and engaging said blocks mounting said base member on the face plate with the transverse median of said member substantially intersecting the axis of the workpiece, each block having a socket therein, a cam-shaped workpiece gripping jaw in each socket and means pivotally securing said jaw in said socket, said jaws being diametrically opposed to each other.

2. A workpiece gripping device for a machine tool comprising a driving shaft, a face plate thereon, a channelled base member formed with a pair of elongated slots in the bight thereof, a pair of jaw supporting blocks in the channel of said member, means engaging through said slots and engaging said blocks for tightly securing said blocks in adjusted position in said member, said means also loosely mounting said base member on said face plate whereby said base member may have relative radial movement, and a pair of cam-shaped workpiece gripping jaws pivotally carried by said blocks.

3. A workpiece gripping device for a machine tool comprising a driving shaft, a face plate on the shaft, a channelled base member formed with a pair of elongated slots in the bight thereof, a pair of blocks engaging in the channel of said member, means engaging through said slots and engaging said blocks mounting said base member on the face plate with the transverse median of said member substantially intersecting the axis of the workpiece, each block having a socket therein, a cam-shaped workpiece gripping jaw in each socket and means pivotally securing said jaw in said socket, said jaws being diametrically opposed to each other, and each jaw being formed with a pair of cam-shaped gripping surfaces whereby the workpiece will be gripped in either direction of rotation of said base member.

STERLING NOWKA.

REFERENCES CITED

The following references are of record in the file of this patent:

UNITED STATES PATENTS

| Number | Name | Date |
|---|---|---|
| 10,585 | Zook | Feb. 28, 1854 |
| 1,912,987 | Lovely | June 6, 1933 |